(12) United States Patent
Kato et al.

(10) Patent No.: US 7,216,541 B2
(45) Date of Patent: May 15, 2007

(54) CAPACITIVE SENSOR FOR DYNAMICAL QUANTITY

(75) Inventors: Kenji Kato, Chiba (JP); Minoru Sudou, Chiba (JP); Mitsuo Yarita, Chiba (JP)

(73) Assignee: Seiko Instruments Inc. (JP)

( * ) Notice: Subject to any disclaimer, the term of this patent is extended or adjusted under 35 U.S.C. 154(b) by 182 days.

(21) Appl. No.: 11/039,500

(22) Filed: Jan. 20, 2005

(65) Prior Publication Data

US 2005/0155428 A1 Jul. 21, 2005

(30) Foreign Application Priority Data

| Jan. 21, 2004 | (JP) | ............................. 2004-012899 |
| Jun. 1, 2004 | (JP) | ............................. 2004-163087 |

(51) Int. Cl.
*G01P 15/125* (2006.01)
(52) U.S. Cl. .................................. 73/514.32; 361/280
(58) Field of Classification Search ............ 73/514.32, 73/504.12; 361/280
See application file for complete search history.

(56) References Cited

U.S. PATENT DOCUMENTS

| 5,760,290 | A | * | 6/1998 | Ueyanagi ..................... 73/1.39 |
| 5,801,313 | A | * | 9/1998 | Horibata et al. .............. 73/718 |
| 6,759,591 | B2 | * | 7/2004 | Yoshida et al. ............. 174/520 |
| 2005/0076719 | A1 | * | 4/2005 | Jakobsen et al. ............. 73/718 |

\* cited by examiner

*Primary Examiner*—John E. Chapman
(74) *Attorney, Agent, or Firm*—Adams & Wilks

(57) ABSTRACT

A capacitive sensor for measuring a dynamical quantity based on a change in capacitance has a semiconductor substrate having a weight supported by beams so as to undergo displacement according to the dynamical quantity. The semiconductor substrate is sandwiched between glass substrates on which fixed electrodes are disposed in a position facing the weight with minute gaps existing between the glass substrates and the weight. A substrate electrode is disposed on one of the glass substrates and contacts a part of the semiconductor substrate. A recess having a size equal to or larger than a contact area in which the semiconductor substrate contacts the substrate electrode is formed in the semiconductor substrate, and a contact electrode is disposed in the recess in contact with the substrate electrode.

8 Claims, 6 Drawing Sheets

CAPACITIVE SENSOR FOR DYNAMICAL QUANTITY

BACKGROUND OF THE INVENTION

1. Field of the Invention

The present invention relates to a capacitive sensor for dynamical quantity for detecting a dynamical physical quantity such as acceleration and angular velocity as a capacitance change and more particularly to a capacitive dynamical quantity sensor which is manufactured through a semiconductor manufacturing process.

2. Description of the Related Art

Heretofore, there has been known an electrostatic capacitive dynamical quantity sensor which has a weight that shifts according to the magnitude of externally applied acceleration or angular velocity, and a beam for supporting the weight formed within a semiconductor substrate, and which serves to detect a change in electrostatic capacitance generated between a movable electrode including the weight and a fixed electrode formed at a minute distance from the movable electrode (refer to JP 8-94666 A, for example). FIG. 9 is a schematic cross-sectional view of the conventional electrostatic capacitive dynamical quantity sensor. In this sensor, weights 91 and beams 92 are formed within a semiconductor substrate 93 through a fine patterning process, and are sealed from both sides by joining an upper substrate 94 and a lower substrate 95. In such an electrostatic capacitive dynamical quantity sensor, in order to have the weight to work as a movable electrode, a part of fixed electrodes 98 has a contact to the semiconductor substrate 93 to control the electrical potential of the weight 91. FIG. 10 is a schematic cross-sectional view of a substrate contact portion. A part of the fixed electrode 98 laminated on a glass substrate 95 is formed so as to extend to a joint area between the glass substrate 95 and the semiconductor substrate 93, and is brought into contact with the semiconductor substrate 93 through the joining. The provision of a contact portion 99 makes it possible to control the electrical potential of the weight 91 formed within the semiconductor substrate 93 (refer to JP 8-94666 A, for example).

The conventional electrostatic capacitive dynamical quantity sensor, however, involves the following problems.

As shown in FIG. 10, an area 100 in which the glass substrate 95 does not contact with the semiconductor substrate 93 is generated in the periphery of the contact portion 99 due to a thickness of the fixed electrode 98 to cause the serious joint failure. This joint failure causes air leakage and the like to degrade the reliability of the device. In addition, it is possible to prevent the reliability degradation by designing a larger joint area in advance to avoid joint failure in the periphery of the contact portion, yet the chip size becomes larger to lead to a higher cost.

SUMMARY OF THE INVENTION

The present invention has been made to solve the above-mentioned problems.

According to the present invention, a capacitive sensor for measuring a dynamical quantity based on a change in capacitance is characterized by including a semiconductor substrate having a weight which is supported by beams and which shifts in accordance with the dynamical quantity including externally applied acceleration and angular velocity; and a glass substrate on which a fixed electrode is disposed in a position facing the weight with a minute gap from the weight, and a substrate electrode contacting with a part of the semiconductor substrate are laminated; wherein a recess having a size equal to or larger than a contact area is formed in an area within the semiconductor substrate in which the semiconductor substrate contacts the substrate electrode.

In the capacitive dynamical quantity sensor, a depth of the recess is smaller than a thickness of the substrate electrode.

In the capacitive dynamical quantity sensor, a contact electrode contacting the substrate electrode is formed within the recess.

In the capacitive dynamical quantity sensor, a depth of the recess is larger than a thickness of the substrate electrode, and a sum of a thickness of the contact electrode and the thickness of the substrate electrode is larger than the depth of the recess.

In the capacitive dynamical quantity sensor, a plurality of grooves or a plurality of holes are formed in a part of the contact electrode.

In the capacitive dynamical quantity sensor, the plurality of grooves or the plurality of holes is disposed at even intervals.

In the capacitive dynamical quantity sensor, a plurality of contact electrodes exists within the recess.

In the capacitive dynamical quantity sensor, the plurality of contact electrodes is disposed at even intervals.

In the capacitive dynamical quantity sensor, the adjacent contact electrodes have substantially the same electrical potential.

In the capacitive dynamical quantity sensor, the adjacent contact electrodes are connected with the same material as the contact electrode.

In the capacitive dynamical quantity sensor, each of the contact electrodes contains aluminum.

DETAILED DESCRIPTION OF THE PREFERRED EMBODIMENTS

Preferred embodiments of the present invention will hereinafter be described in detail by giving as an example an angular velocity sensor which is typical of a capacitive dynamical quantity sensor with reference to the accompanying drawings.

Embodiment 1

Figure 1:
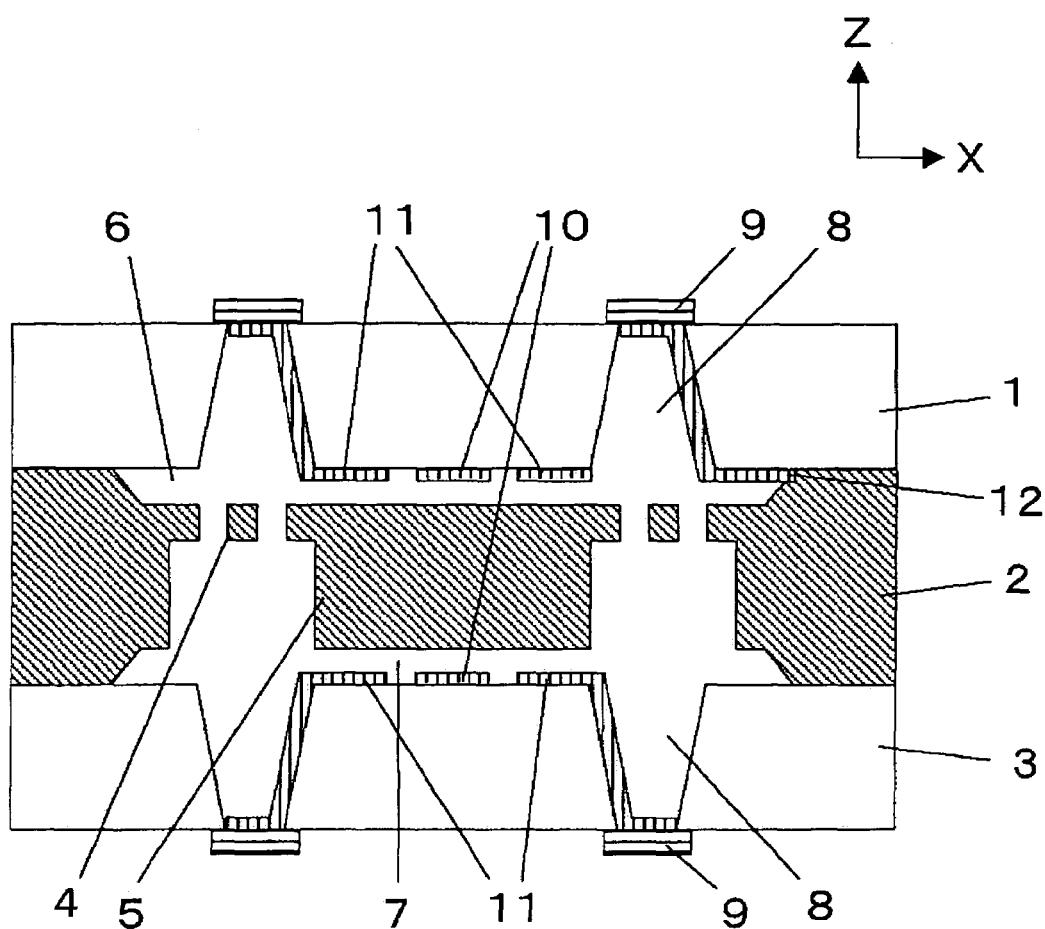
FIG. 1 is a schematic cross-sectional view explaining a capacitive dynamical quantity sensor according to Embodiment 1 of the present invention.

FIG. 1 is a schematic cross-sectional view explaining a capacitive dynamical quantity sensor according to Embodiment 1 of the present invention. The capacitive dynamical quantity sensor has a three-layer structure having an upper glass substrate 1, a silicon substrate 2 and a lower glass substrate 3. Those three substrates 1, 2 and 3 are joined to one another to form a structure. A vibrating body having beams 4 and a weight 5 is formed within the semiconductor (silicon) substrate 2 through an etching process, and the vibrating body (having the beams 4 and the weight 5) vibrates or twists due to an applied external force. The thickness, width and length of each of the beams 4, and the thickness, area and the like of the weight 5 is designed to have a desired elastic constant and a desired resonance frequency. In addition, minute gaps 6 and 7 are defined between the beams 4 and the weight 5 which are formed within the semiconductor substrate 2, and the upper and lower glass substrates 1 and 3 facing the beams 4 and the weight 5 respectively. The vibrating body (having the beams 4 and the weight 5) is connected to an outer peripheral portion of the semiconductor substrate 2 through the beams 4. By application of an external force, the beams 4 supporting the weight 5 bends, and hence the weight 5 moves within the minute gaps 6 and 7.

Through-holes 8 are formed in a part of the upper and lower glass substrates 1 and 3 sandwiching the silicon substrate 2 in which the vibrating body (having the beams 4 and the weight 5) is formed. Electrodes formed inside the upper and lower glass substrates 1 and 3 are drawn to the outside through the through-holes 8. A conductive material 9 is laminated on the opening at outer end of each of the through-holes 8, and the space (the minute gaps 6 and 7) defined between the upper and lower glass substrates 1 and 3 is thus sealed with the conductive material 9. Fixed electrodes for excitation 10, fixed electrodes for detection 11, and a substrate electrode 12 which are formed inside the upper and lower glass substrates 1 and 3 are connected to the conductive materials 9 respectively to have external connection through wirings formed on sidewalls of the through-holes 8.

Figure 2:
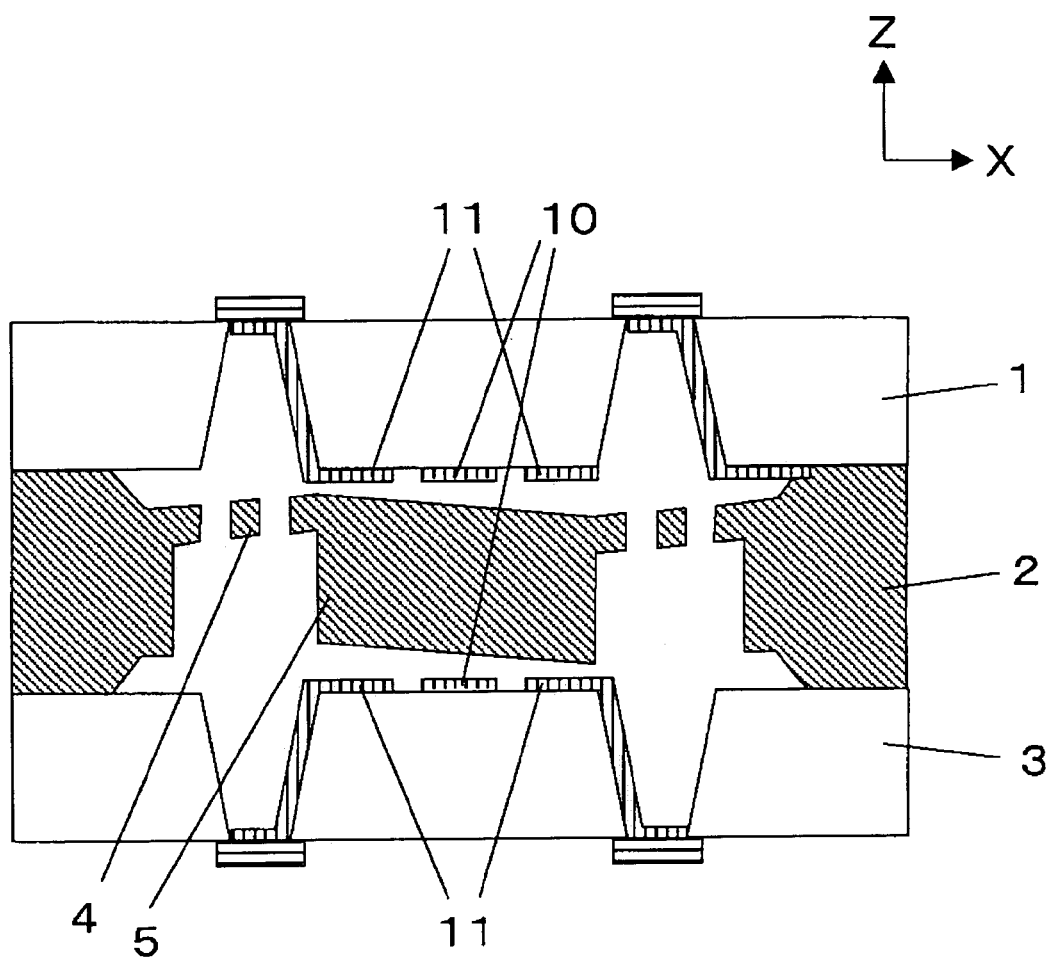
FIG. 2 is a schematic cross-sectional view explaining the capacitive dynamical quantity sensor according to Embodiment 1 of the present invention.

The capacitive dynamical quantity sensor according to Embodiment 1 operates based on the same principles as those of the sensor described in JP 8-94666 A, for example. Here, the principles of the operation of the capacitive dynamical quantity sensor will hereinafter be described in brief. An AC voltage is applied to each of the fixed electrodes for excitation 10 provided on the inner surfaces of the upper and lower glass substrates 1 and 3, and the vibrating body (having the beams 4 and the weight 5) is vertically vibrated by an electrostatic force acting between the fixed electrodes for excitation 10 and the vibrating body (having the beams 4 and the weight 5) which is held at the ground potential as a movable electrode. When an angular velocity around the y-axis is applied to the vibrating body (having the beams 4 and the weight 5) to which the velocity is applied in the z-axis direction in such a manner, a Coriolis force expressed in the form of a vector product of the velocity and the angular velocity is given to the x-axis direction, and as a result, the beams 4 bends as shown in FIG. 2. The fixed electrodes for detection 11 are provided on the inner surfaces of the upper and lower glass substrates 1 and 3, respectively. Then, the value of the angular velocity is detected from a change in capacitance formed between the fixed electrodes for detection 11 and the weight 5 as the movable electrode due to the slant of the weight 5 caused by the bending of the beams 4.

Figure 3:
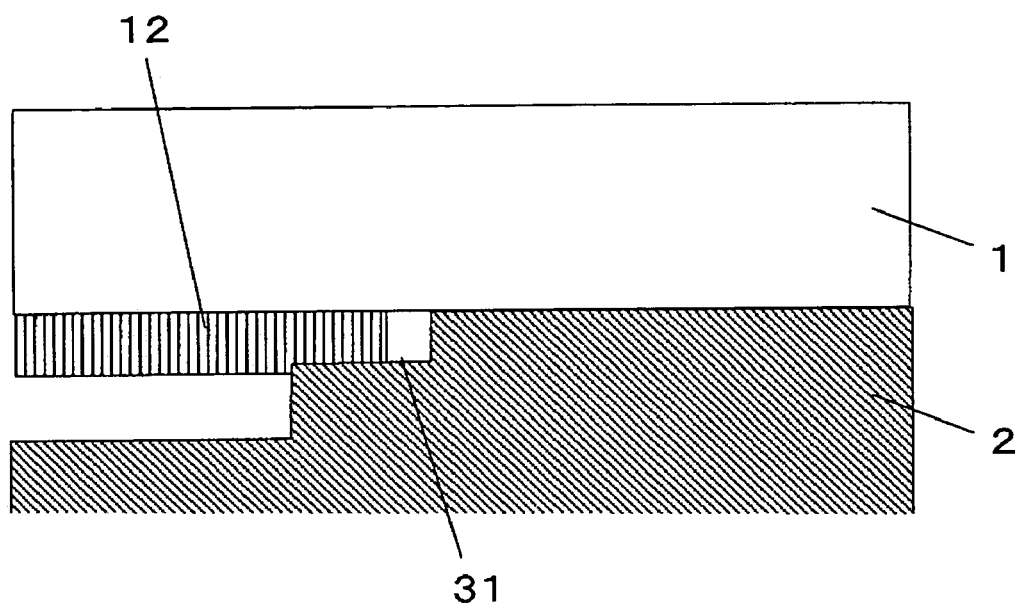
FIG. 3 is a schematic cross-sectional view explaining a contact portion of a silicon substrate in the capacitive dynamical quantity sensor according to Embodiment 1 of the present invention.

Here, FIG. 3 is a schematic cross-sectional view explaining a contact portion between the silicon substrate 2 and the substrate electrode on the upper glass substrate 1 in the capacitive dynamical quantity sensor according to Embodiment 1 of the present invention. A recess 31 is formed in an area in which the substrate electrode 12 formed on the inner surface of the upper glass substrate 1 overlaps the silicon substrate 2 within the silicon substrate 2. A depth of the recess 31 is smaller than a thickness of the substrate electrode 12, and hence the substrate electrode 12 contacts the silicon substrate 2 within the recess 31. The substrate electrode 12 can move in a horizontal direction with respect to the upper glass substrate 1 as much as the volume in which the substrate electrode 12 contacts the silicon substrate 2. The moved substrate electrode 12, however, still remains in the recess 31, since a bottom surface area of the recess 31 is larger than the area in which the silicon substrate 2 contacts the substrate electrode 12. Hence, the joint failure due to the thickness of the substrate electrode 12 does not occur in the periphery of the recess 31. Consequently, it is possible to enhance the reliability of the capacitive dynamical quantity sensor.

Embodiment 2

Figure 4:
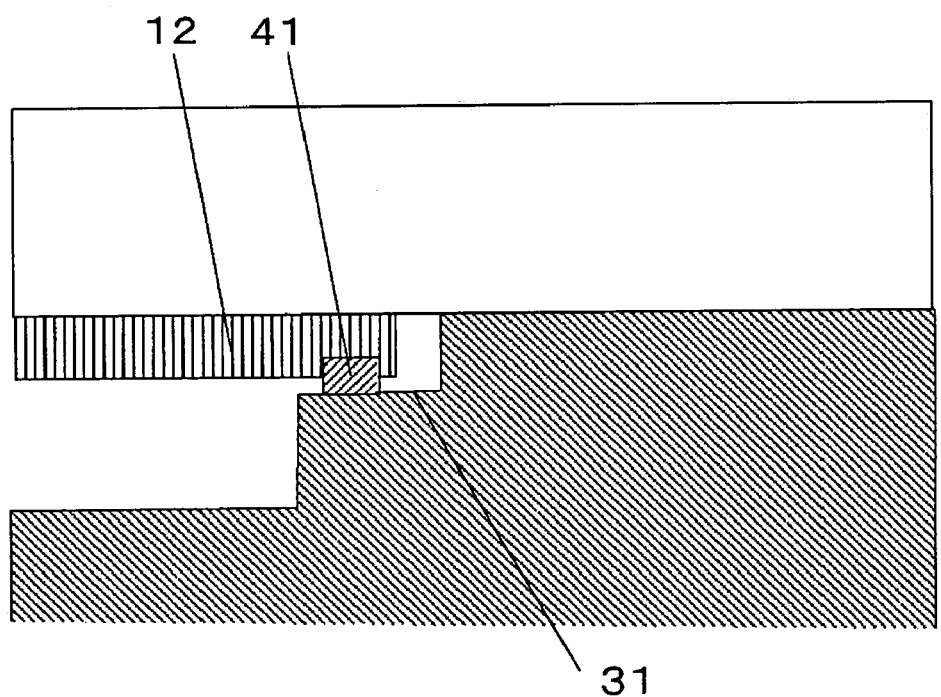
FIG. 4 is a schematic cross-sectional view explaining a contact portion of a silicon substrate in a capacitive dynamical quantity sensor according to Embodiment 2 of the present invention.
Figure 5:
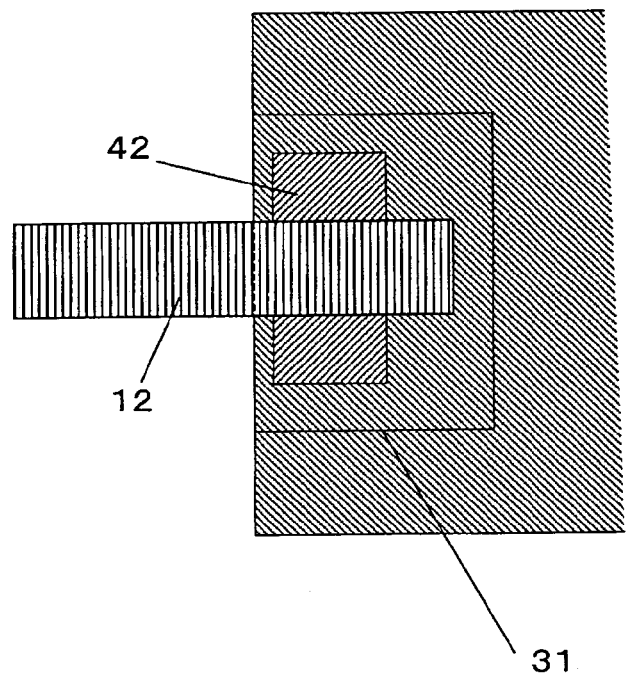
FIG. 5 is a schematic plan view explaining a contact portion of the silicon substrate in the capacitive dynamical quantity sensor according to Embodiment 2 of the present invention.
Figure 6:
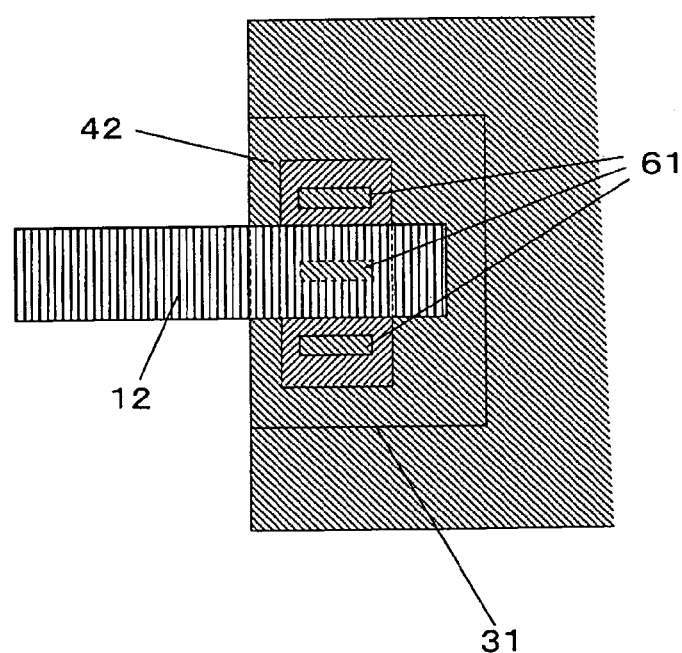
FIG. 6 is a schematic plan view explaining a contact portion of the silicon substrate in the capacitive dynamical quantity sensor according to Embodiment 2 of the present invention.
Figure 7:
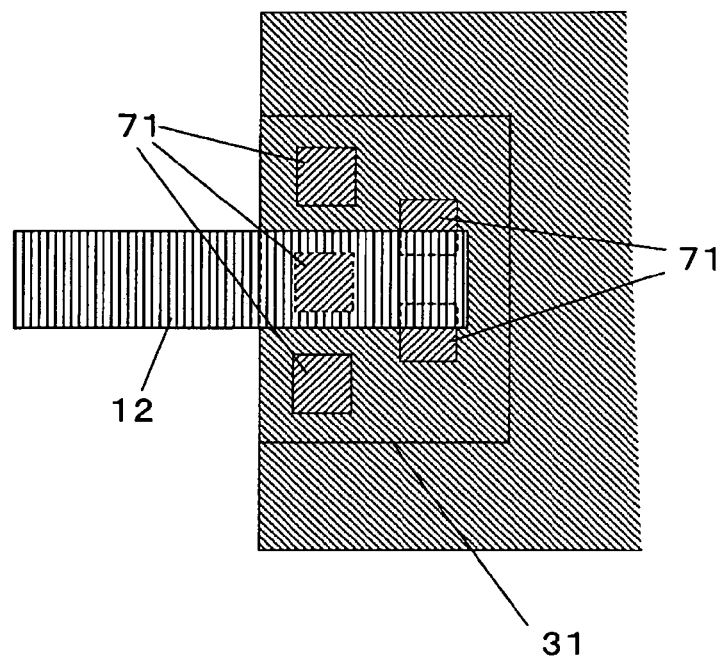
FIG. 7 is a schematic plan view explaining a contact portion of the silicon substrate in the capacitive dynamical quantity sensor according to Embodiment 2 of the present invention.

FIG. 4 is a schematic cross-sectional view explaining a contact portion formed between the silicon substrate and the substrate electrode 12 on the upper glass substrate in a capacitive dynamical quantity sensor according to Embodiment 2 of the present invention. A contact electrode 41 is formed within the recess 31. Then, the contact electrode 41 contacts the substrate electrode 12, thereby ensuring an electrical potential of the semiconductor substrate through the contact. A thickness of the substrate electrode 12 is set larger than the value which is obtained by subtracting a thickness of the contact electrode 41 from a depth of the recess 31 to make the substrate electrode 12 contact with the contact electrode 41. FIGS. 5, 6 and 7 are schematic plan views of the contact areas.

As shown in FIG. 5, a contact electrode 42 is formed so as to overlap the substrate electrode 12 within the recess 31. In order to prevent the substrate electrode 12 overlapping the contact electrode 42 from protruding to a joint area, a space for accommodating therein a part of the moved substrate electrode 12 is ensured in the periphery of the contact electrode 42 within the recess 31.

Similarly, in FIG. 6, grooves 61 allowing a part of the moved substrate electrode to be accommodated therein are formed within the contact electrode 42. A width of each of the grooves 61 is set smaller than that of the contact electrode 42, thereby allowing the contact to be surely obtained. Since a part of the moved substrate electrode is accommodated in the corresponding one of the grooves 61, a portion of the substrate electrode 12 moved to the periphery of the contact electrode 42 becomes relatively small. Hence, the area of the recess 31 can be reduced, and thus the chip size can be reduced. While FIG. 6 shows the case where the grooves 61 are formed in the contact electrode 42, it is to be understood that instead of grooves, circular, rectangular or elliptical holes may also be formed within the contact electrode 42.

In addition, as shown in FIG. 7, a plurality of contact electrodes 71 may be provided. In this case, with respect to a width direction of the substrate electrode 12, a distance between the adjacent contact electrodes 71 is set smaller than a width of the substrate electrode 12, whereby even when a small position shift is caused between the contact electrode 71 and the substrate electrode 12, the contact can be necessarily obtained between the contact electrode 71 and the substrate electrode 12. Even in such a structure, since a space for movement is ensured in the periphery of each contact electrode 71, no joint failure is caused between the substrate electrode 12 moved due to contact and the contact electrodes, and thus the recess area can be reduced. Consequently, reliability in the joining can be enhanced, and also capacitive dynamical quantity sensors suitable for miniaturization can be manufactured.

Figure 8:
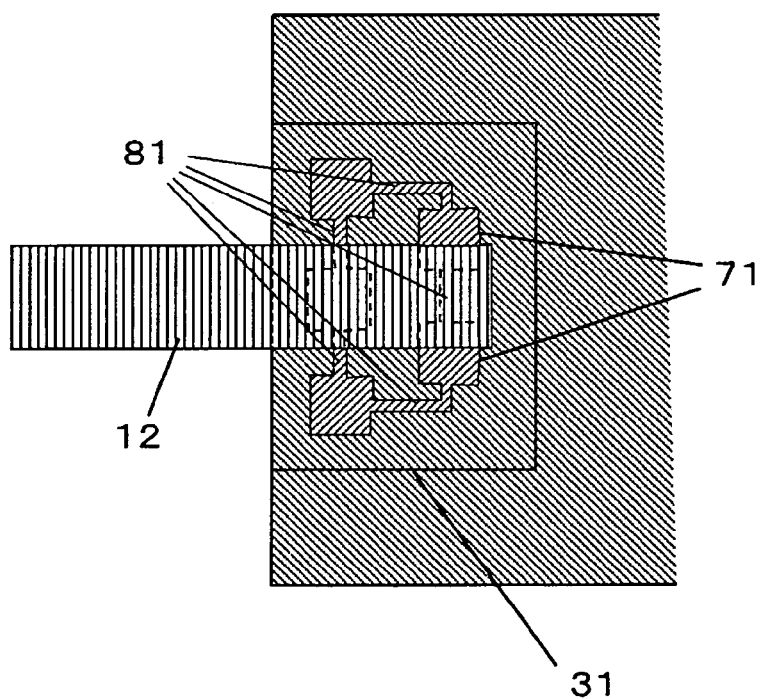
FIG. 8 is a schematic plan view explaining a contact portion of the silicon substrate in the capacitive dynamical quantity sensor according to Embodiment 2 of the present invention.
Figure 9:
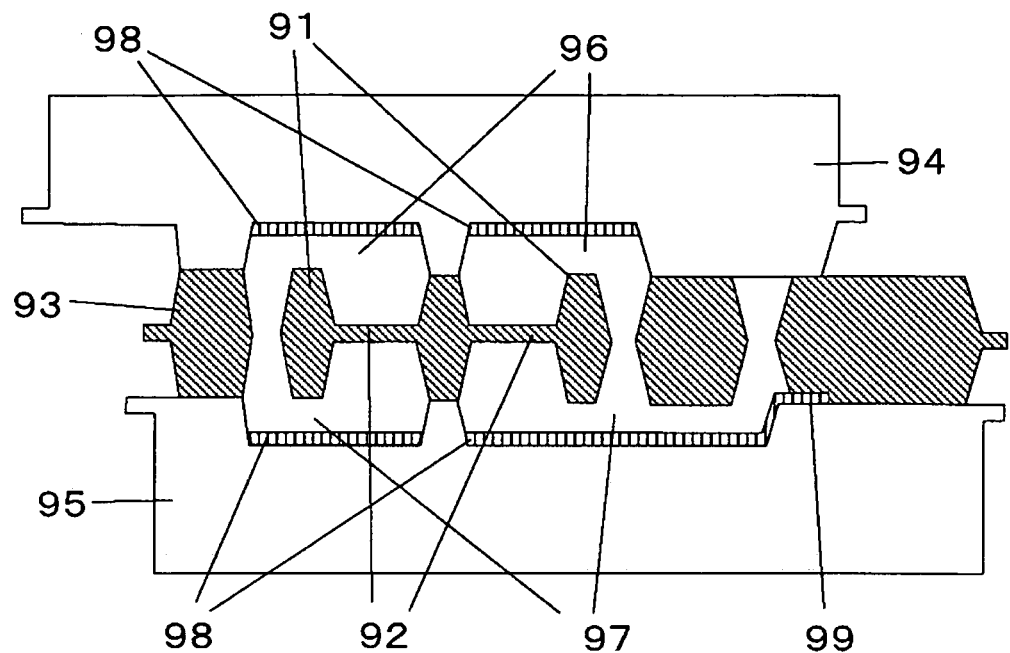
FIG. 9 is a schematic cross-sectional view explaining a conventional capacitive dynamical quantity sensor.
Figure 10:
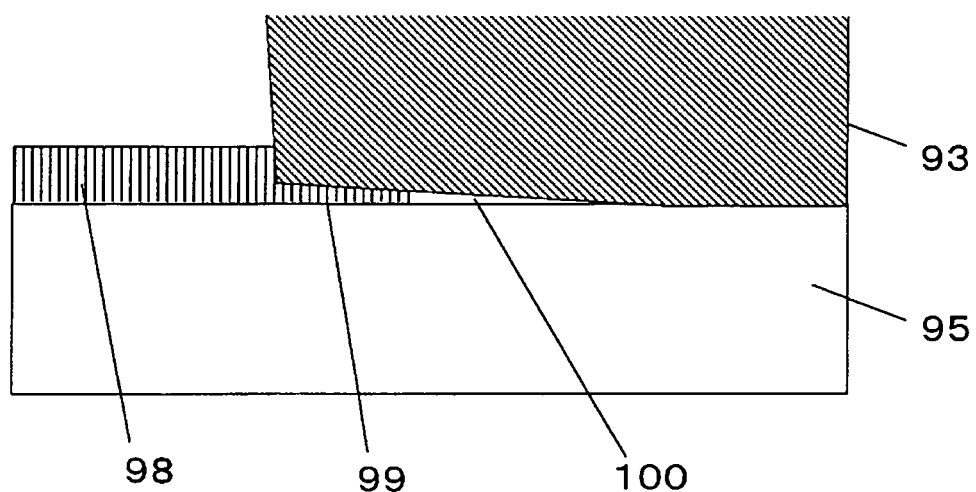
FIG. 10 is a schematic cross-sectional view explaining a substrate contact portion of the conventional capacitive dynamical quantity sensor.

In addition, as shown in FIG. 8, the adjacent contact electrodes 71 may be connected to each other through a connection portion 81. When the adjacent contact electrodes 71 are connected to each other, if only the substrate electrode 12 is connected to any one of the adjacent contact electrodes 71, all the contact electrodes 71 connected to one another through the connection portion 81 are at the same electrical potential. Thus, even when there is a small position shift in the joint between the silicon substrate 2 and the upper glass substrate, if only the substrate electrode 12 contacts any one of the contact electrodes 71, the contact resistance can be usually, stably obtained. Here, when each of the connection portions 81 is made of the same material as that of each of the contact electrodes 71, the connection portions 81 can be formed without increasing the production cost. In addition, a metal containing aluminum which is easily plastically-deformed, and which is low in the production cost is a suitable material for the contact electrodes 71 and the connection portions 81. However, of course, a conductive material such as a metal such as gold, silver, titanium, or chromium, or silicon having impurities implanted thereinto may also be used.

In these embodiments the joint failure in the periphery of the recess can consequently be avoided and the reliability can be increased since the contact between the substrate electrode and the semiconductor substrate is attained within the recess. In addition, the structure provided by the present invention can avoid the increase in cost since there is no need to increase the joint area.

In the electrostatic capacitive dynamical quantity sensor for controlling the electrical potential of the semiconductor substrate through the substrate electrode laminated on the glass substrate to be joined, the structure is adopted in which the recess is formed within the semiconductor substrate, and a part of the semiconductor substrate contacts the substrate electrode within the recess, whereby it is possible to avoid the joint failure in the periphery of the recess. Consequently, it is possible to provide a electrostatic capacitive dynamical quantity sensor which is excellent in reliability and which is suitable for low cost manufacturing.

While Embodiments 1 and 2 have been described by giving the angular velocity sensor as an example, the present invention is not intended to be limited thereto. That is, the present invention can be applied to all kinds of capacitance change detection type dynamical quantity sensors such as a velocity sensor and a pressure sensor.

What is claimed is:

1. A capacitive dynamical quantity sensor for measuring a dynamical quantity based on a change in capacitance between a weight and a fixed electrode due to displacement of the weight, comprising:
   a semiconductor substrate having a weight supported by beams so as to undergo displacement according to the dynamical quantity; and
   a glass substrate having a fixed electrode disposed thereon in a position facing the weight such that a minute gap exists between the fixed electrode and the weight and having a substrate electrode disposed thereon in contact with a part of the semiconductor substrate;
   wherein the semiconductor substrate has a recess formed therein, the recess having a size equal to or larger than a contact area in which the semiconductor substrate contacts the substrate electrode, a contact electrode is disposed within the recess in contact with the substrate electrode, and plural grooves or plural holes are disposed in a part of the contact electrode.

2. A capacitive dynamical quantity sensor according to claim 1, wherein a depth of the recess is smaller than a thickness of the substrate electrode.

3. A capacitive dynamical quantity sensor according to claim 1, wherein a depth of the recess is larger than a thickness of the substrate electrode, and a sum of a thickness of the contact electrode and the thickness of the substrate electrode is larger than the depth of the recess.

4. A capacitive dynamical quantity sensor according to claim 1, wherein the plural grooves or the plural holes are disposed at even intervals.

5. A capacitive dynamical guantity sensor for measuring a dynamical guantity based on a change in capacitance between a weight and a fixed electrode due to displacement of the weight, comprising:
   a semiconductor substrate having a weight supported by beams so as to undergo displacement according to the dynamical guantity; and
   a glass substrate having a fixed electrode disposed thereon in a position facing the weight such that a minute gap exists between the fixed electrode and the weight and having a substrate electrode disposed thereon in contact with a part of the semiconductor substrate;
   wherein the semiconductor substrate has a recess formed therein, the recess having a size egual to or larger than a contact area in which the semiconductor substrate contacts the substrate electrode, and plural contact electrodes are disposed within the recess in contact with the substrate electrode.

6. A capacitive dynamical quantity sensor according to claim 5, wherein the plural contact electrodes are disposed at even intervals.

7. A capacitive dynamical quantity sensor according to claim 5, wherein adjacent contact electrodes are connected together with the same material as that of the contact electrodes.

8. A capacitive dynamical quantity sensor according to claim 5, wherein each of the contact electrodes contains aluminum.

* * * * *